United States Patent [19]
Judge et al.

[11] Patent Number: 6,003,410
[45] Date of Patent: Dec. 21, 1999

[54] SYSTEM AND METHOD FOR DETERMINING THE AMOUNT OF REFRIGERANT IN A VAPOR COMPRESSION SYSTEM

[75] Inventors: John F. Judge; Frank H. Hill, both of York, Pa.

[73] Assignee: York International Corporation, York, Pa.

[21] Appl. No.: 09/072,046

[22] Filed: May 5, 1998

[51] Int. Cl.⁶ .............................. G01F 23/02; F25B 49/00
[52] U.S. Cl. ................... 76/323; 73/328; 62/125
[58] Field of Search ................... 62/125; 73/323, 73/326, 328, 329, 330, 331, 332, 333

[56] References Cited

U.S. PATENT DOCUMENTS

| | | |
|---|---|---|
| 2,111,283 | 3/1938 | Fish . |
| 2,608,301 | 8/1952 | Graves et al. . |
| 4,454,759 | 6/1984 | Pirkle . |
| 5,711,161 | 1/1998 | Gustafson . |

FOREIGN PATENT DOCUMENTS

| | | |
|---|---|---|
| 39 40 636 A1 | 6/1991 | Germany . |
| WO 94/03781 | 2/1994 | WIPO . |

OTHER PUBLICATIONS

European Patent Office International Search Report, PCT/US 99/07318, Aug. 2, 1999.

*Primary Examiner*—Hezron Williams
*Assistant Examiner*—Willie Morris Worth
*Attorney, Agent, or Firm*—Finnegan, Henderson, Farabow, Garrett & Dunner, L.L.P.

[57] ABSTRACT

A system and method for measuring a refrigerant in a vapor compression system utilizes a sight glass in fluid communication with the condenser. Refrigerant collects in the sight glass and, upon reaching equilibrium, can be read to provide an accurate measure of the amount of refrigerant in the entire vapor compression system.

13 Claims, 3 Drawing Sheets

6,003,410

SYSTEM AND METHOD FOR DETERMINING THE AMOUNT OF REFRIGERANT IN A VAPOR COMPRESSION SYSTEM

BACKGROUND OF THE INVENTION

1. Field of the Invention

The present invention relates to systems and methods for determining the amount of refrigerant in vapor compression systems, and more specifically to a device and method for determining such amount by measuring the refrigerant collected in a sight glass attached to the system.

2. Description of the Related Art

Heating, ventilating, air conditioning, and refrigeration systems rely on cycling a refrigerant through stages of compression and expansion. As the refrigerant undergoes compression, it changes state from a gas to a liquid. As the refrigerant expands, it reverts to the gas phase. The thermodynamic properties of the refrigerant are such that these phase changes produce certain desired conditioning effects, such as cooling, heating, and dehumidifying.

In order for these systems to operate optimally, the amount of refrigerant must be maintained at certain desired levels. If the refrigerant charge diminishes, as may happen in the case of a system leak, system performance may suffer. Thus, knowing the amount of refrigerant in a system at any given time provides helpful diagnostic information. Moreover, the ability to determine the amount of refrigerant allows a manufacturer or user to develop performance specifications based on empirical data obtained by observing how system performance values vary with differing amounts of refrigerant. For these and other reasons, there is a need to easily and economically determine the amount of refrigerant in an HVAC system at any given time.

Typically, if the amount of refrigerant in a vapor compression system is to be measured, all of the refrigerant must be removed from the system and then weighed. This procedure, apart from its time-consuming and labor-intensive nature, requires that the system be shut down for considerable time as the complete removal and subsequent recharging of the refrigerant takes place. Such downtime produces disadvantages, including, notably, the extended loss of conditioning to the environment served by the system.

While there are some devices and methods that provide for observing the refrigerant in a system without entirely evacuating the refrigerant, the approaches known to the inventors have drawbacks and/or fail to specifically determine the amount of refrigerant present in the system. For example, U.S. Pat. No. 3,191,397 to Kennedy is directed to an air conditioning system that includes means for determining whether the system contains the proper charge of refrigerant. This is accomplished by viewing the refrigerant through a sight glass disposed on a storage receptacle. If, during system operation, a liquid-vapor interface is observed, then the system contains the proper amount of refrigerant. This observation, though, fails to provide a quantitative measurement of the amount of refrigerant in the system, focusing instead on the quality of the refrigerant's phase. Thus, Kennedy provides but a threshold measurement—namely, whether an appropriate amount of refrigerant is present—rather than an actual volumetric measurement.

SUMMARY OF THE INVENTION

An object of the present invention is to provide a simple and inexpensive device for determining the quantity of refrigerant in a vapor compression system.

Additional objects and advantages of the invention will be set forth in part in the description that follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention comprises a measuring system for determining the amount of refrigerant in a vapor compression system, the measuring system comprising a housing defining an interior cavity for holding a sample of the refrigerant; a first fitting extending from a first axial end of said housing, and a second fitting extending from a second axial end of said housing, both of said fittings being in fluid communication with the interior cavity of the housing; a window on said housing for permitting the visual inspection of the level of refrigerant in the cavity; fluid lines for providing fluid communication between the first and second fittings and a top portion and a bottom portion, respectively, of a condenser of the vapor compression system; and a calibrated scale proximate said housing, said scale including markings corresponding to the total amount of refrigerant in the vapor compression system.

The device is comprised of a cylindrical container with a hollow cavity, capable of collecting a quantity of refrigerant. The body of the device is generally transparent, which allows for the observation of the refrigerant level within the cavity. As such, the device functions in a manner akin to a sight glass.

An attachment fitting extends outwardly at each axial end of the device. These fittings preferably attach at two access points on a condenser—one at the top of the condenser, the other at the bottom. A third fitting, located at one end of the device, connects to a vacuum pump or sample bottle. Preferably, the attachment fittings include a valve.

Through a series of steps described below, the amount of the refrigerant in the system is determined by allowing a portion of refrigerant passing through the condenser to bleed into the sight glass. Ultimately, the level of the refrigerant is measured by placing the sight glass next to a scale calibrated to the volume of refrigerant in the system. Thus, the quantity of the refrigerant in the system can be determined by noting which mark on the scale corresponds to the liquid level in the sight glass. Preferably, the scale is disposed on a wall of the vapor compression unit.

The invention further comprises a method for determining the amount of refrigerant in a vapor compression system, said vapor compression system including a condenser, a liquid valve after said condenser, a compressor, a discharge service valve on said compressor, and an evaporator, the method comprising placing a sight glass in fluid communication with the condenser, the sight glass including a housing defining an interior cavity for holding a volume of refrigerant, and a window on said housing for permitting visual inspection of the level of refrigerant in the cavity; a first axial end, and an opposed second axial end, said first end being in fluid communication with a top portion of the condenser, and said second end being in fluid communication with a bottom portion of the condenser; allowing refrigerant to flow from the condenser into the sight glass cavity until an equilibrium level is reached; and comparing the level of refrigerant in the sight glass cavity to a calibrated scale having graduated markings, whereby the amount of refrigerant in the vapor compression system is determined by reading the marking on the scale adjacent the refrigerant level in the sight glass cavity.

Owing to the advantageous features of the present invention, as little as one-tenth of one percent of the refrigerant present in the system can provide the volume necessary with which to derive a measurement constituting the amount of refrigerant in the entire system.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE PREFERRED EMBODIMENTS

Reference will now be made in detail to exemplary embodiments of the invention, examples of which are illustrated in the accompanying drawings. Wherever possible, the same reference numbers will be used throughout the drawings to refer to the same or like parts.

As will be explained more fully below, the present invention is directed to a system and method for determining the amount of refrigerant in a vapor compression system. In the system of the present invention, a sight glass is placed in fluid communication with the vapor compression system, and a portion of the refrigerant within the system is allowed to accumulate in the sight glass. Preferably, the sight glass is placed in fluid communication with the top and bottom of a condenser so that liquid refrigerant from the compressor flows into the sight glass. In turn, the volume level of refrigerant in the sight glass is measured against a calibrated scale on the outside of the condenser, proximate the sight glass, thereby yielding a measure of the refrigerant in the system.

Figure 1:
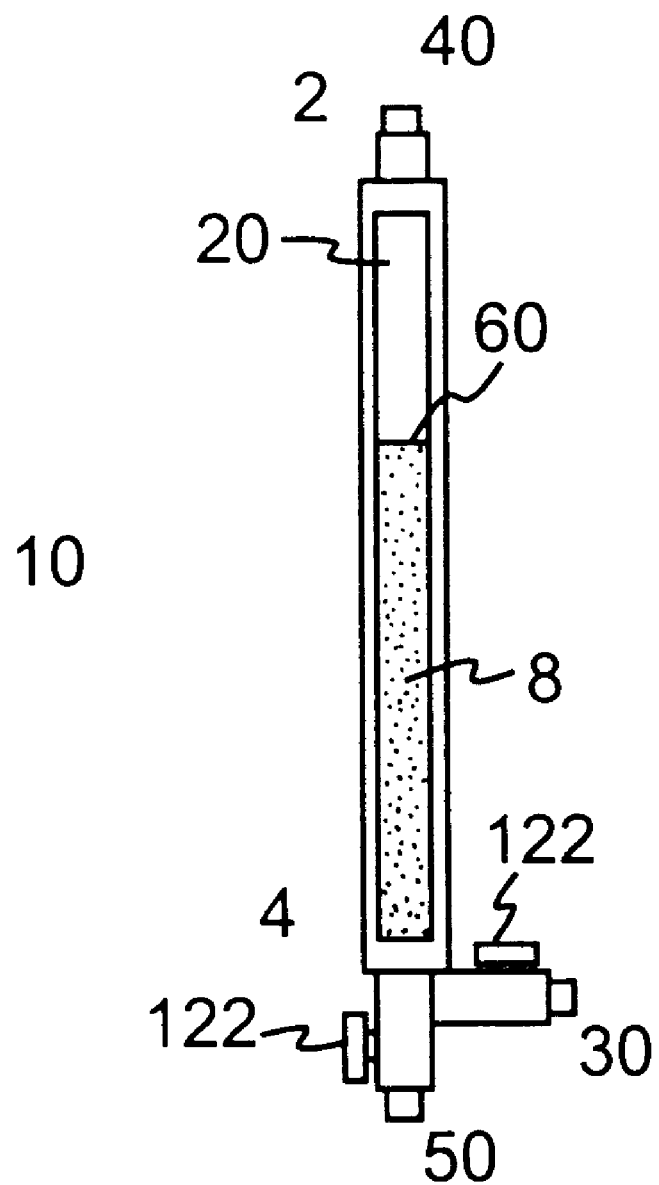
FIG. 1 is a side view of the device of the present invention.
Figure 2:
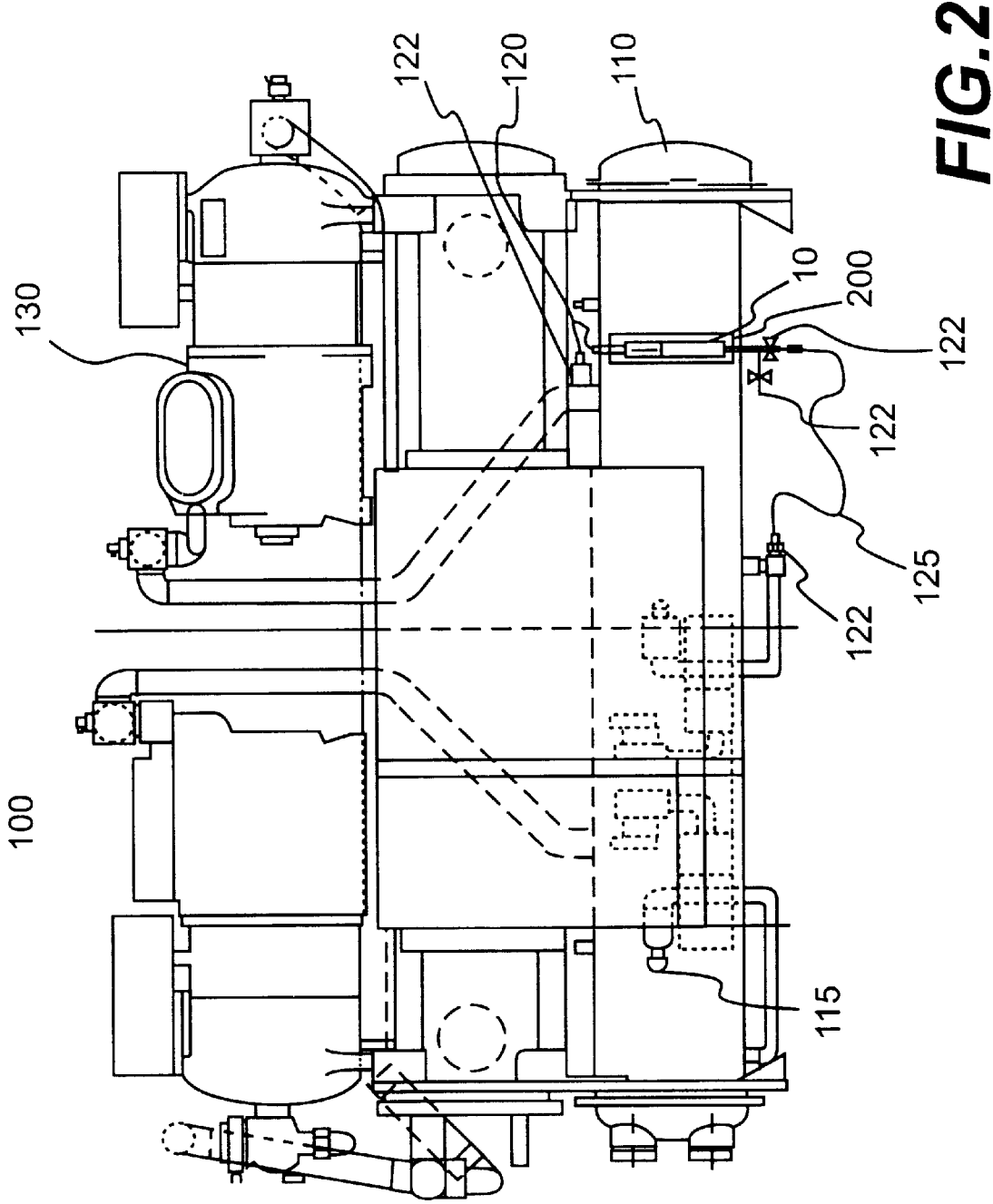
FIG. 2 is a side view of a vapor compression system incorporating the device of the present invention.

With reference to FIGS. 1 and 2, the cylindrical sight glass 10 of the present invention includes an elongated cavity 20, where the refrigerant 8 collects as part of the procedure of determining the total amount of refrigerant 8 in the vapor compression system 100. At least a portion of the body of the sight glass 10 is generally transparent, permitting the observation of the refrigerant level 60 within the cavity 20.

Preferably, measurement of the refrigerant level is conducted with refrigerant charge stored in the condenser 110. It is to be understood that in vapor compression systems 100 comprising more than one circuit, the measurement of refrigerant in each circuit can be conducted by observing the refrigerant stored in the respective condenser 110. FIG. 2 shows a dual circuit system. For the sake of clarity, however, the present invention is described with attention to one circuit.

At each axial end 2, 4 of the sight glass 10 are fittings 40, 50 for connection to a condenser 110 of the vapor compression system 100. One fitting 40 provides a line of fluid communication from the top of the sight glass 10 to an upper portion of the condenser 110. The other fitting 50 provides a line of fluid communication from the bottom of the sight glass 10 to the bottom of the condenser 110. These fittings 40, 50 are preferably attached along the top and bottom, respectively, of the condenser 110 at points most conveniently accessible. Preferably, the connection between the sight glass fittings 40, 50 and the condenser 110 is made with refrigerant hoses 120, 125 that can be permanently or temporarily attached to fittings or points on the bottom and top of the condenser 110. Furthermore, valves 122 preferably are incorporated in the flow lines between the sight glass 10 and the condenser 110 so to open and close the flow of refrigerant 8 through these lines. When both lines are opened, it is possible for a portion of refrigerant 8 to pass from the condenser 110 and into the sight glass 10, filling until the refrigerant 8 reaches an equilibrium level 60. In this manner, a true fill is achieved.

The sight glass 10 preferably includes a third fitting 30, adjacent the fitting 50 associated with the bottom of the condenser 110. This fitting 30 can be connected to a vacuum pump, which can evacuate the sight glass cavity 20 prior to introducing refrigerant 8 from the condenser 110. In addition, fitting 30 may alternatively be used to permit a sample of refrigerant 8 to be taken and tested. As with the other fittings 40, 50, fitting 30 preferably includes a valve 122 and can be connected to a tube.

Figure 3:
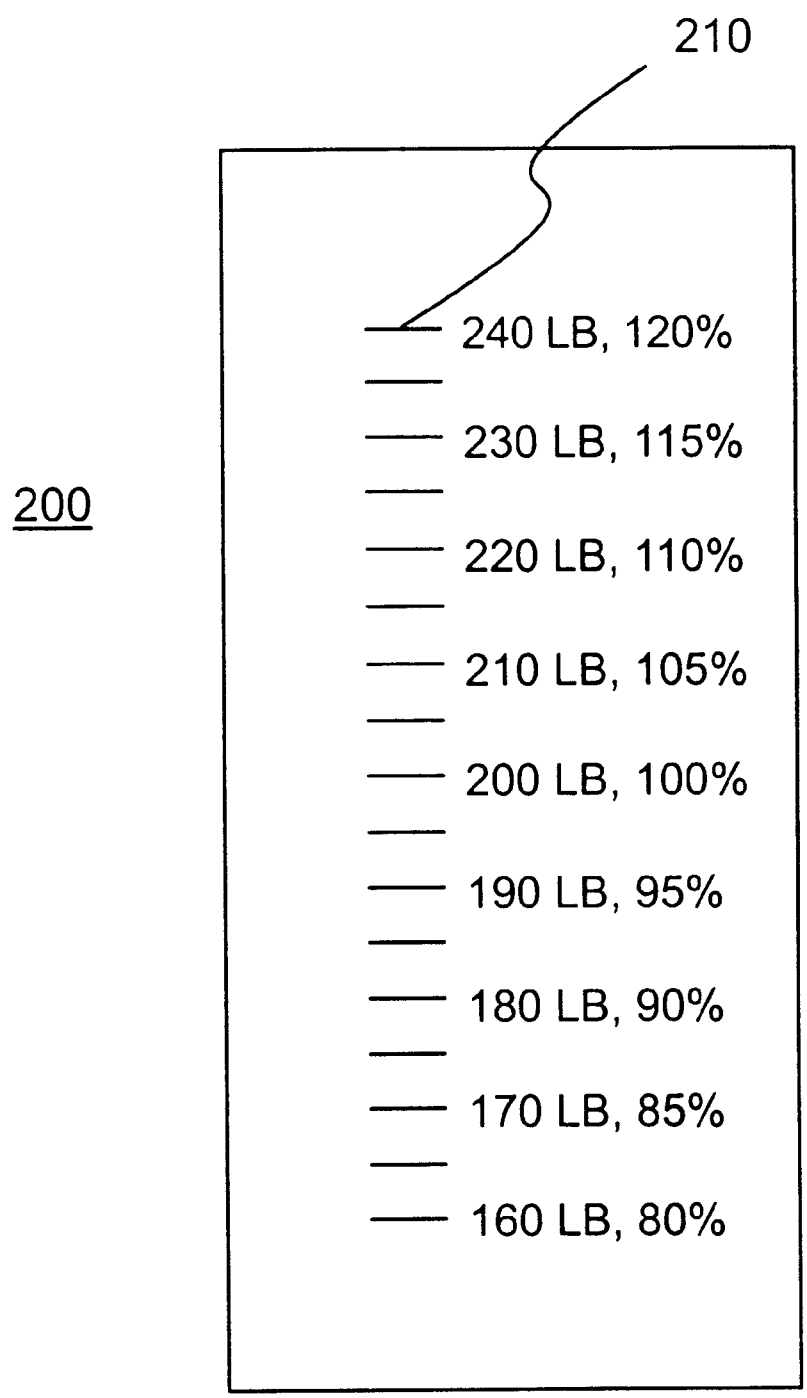
FIG. 3 is a front view of the graduated scale of the present invention.

In a preferred embodiment, a graduated scale 200 is placed on the condenser 110. As an example, FIG. 3 shows such a graduated scale 200. The markings 210 of the scale 200 are calibrated to provide a relationship between the refrigerant level 60 in the sight glass 10 and the amount of refrigerant in the vapor compression system 100. The graduated scale 200 can be marked directly on the condenser 110 itself or can be a flat scale that is fixed to the condenser 110. The markings 210 on the scale 200 are determined through analytical or empirical methods, so that the markings 210 correspond to an actual amount of liquid refrigerant that the condenser 110 can hold, at the respective markings 210. By knowing the characteristics of the entire system 100, these markings 210 can also indicate the relative percentage of system charge, to a given preferred value.

In order to obtain a measurement of the amount of refrigerant 8 in the system 100, the sight glass 10, after filling with refrigerant 8, is placed adjacent the scale 200. Preferably, proper alignment of the sight glass 10 relative the scale 200 is assured by the use of vertical and horizontal guidance marks on the scale 200. Alternatively, a bubble level can be used to ensure proper orientation of the sight glass 10. Next, the marking 210 of the scale 200 corresponding to the meniscus of the refrigerant level 60 is read. The value associated with this marking indicates the amount of refrigerant 8 in the system 100. Preferably, the markings 210 also reflect the refrigerant amount in pounds of charge or percentage of system charge. As FIG. 3 illustrates, the scale markings 210 can be made to represent various units of measure.

Preferably, the scale 200 is disposed on a surface of the condenser 110 of the vapor compression system 100, particularly if the surface of the condenser 110 is relatively flat. As an alternative, a flat plate can be fixed to the condenser 110. The scale 200 can also be mounted to any other suitable bracketing on the system 100 that allows proper vertical orientation. Where defects in surface finish exist, they can be eliminated using common surfacing processes to ensure that the scale 200 is mounted vertically along its axis. As can be seen by referring back to FIG. 2, either such placement affords a very convenient manner for measuring the refrigerant level 60 because the sight glass 10 can easily be moved adjacent the scale 200 without requiring disconnection from the refrigerant hoses 120, 125 or removal of the hoses 120, 125 from the condenser 110. Preferably, the scale 200 is attached to a surface on the system 100 immediately adjacent the location where the sight glass 10 rests as it fills with refrigerant 8. It is possible to fix the sight glass 10 immediately adjacent and parallel to the markings 210 on the scale 200.

After the sight glass 10 and the scale 200 of the present invention are combined with the vapor compression system 100, the following procedure describes a method for determining the amount of refrigerant 8 in the system 100. Initially, with the system 100 operating, the liquid shutoff valve 115, used to isolate refrigerant on the liquid drain leaving the condenser 110, is closed. The compressor 130 is then run until it shuts off under low pressure from the low pressure safety switch. This step can be repeated several times until virtually all the refrigerant 8 has passed from the evaporator to the condenser 110. Alternatively, external means can be used to so transfer the refrigerant. At this point, what remains of the refrigerant in the compressor 130 is a small amount of gas at low pressure-an amount that in condensed form would be insufficient to affect the measurement of liquid level in the condenser 110.

Once the refrigerant 8 has been pulled from the evaporator and into the condenser 110, the discharge service valve on the compressor 130 is closed, thus preventing the refrigerant 8 from leaking back into the evaporator. The liquid in the condenser 110 is now isolated between the discharge service valve on the compressor 130 and the liquid line shutoff valve 115 in the condenser drain line. In complex systems, where additional refrigerant paths may lead from the condenser, the liquid refrigerant in the condenser 110 would also have to be isolated with respect to those additional paths. Next, if the sight glass 10 is not already attached, the sight glass 10 is attached to the condenser 110, with one end 2 connected to the top of, or above, the condenser 110 and the other end 4 connected to the bottom of, or below, the condenser 110. Preferably, these connections are made through refrigerant hoses 120, 125 and valves 122. These valves 122 can be selectively opened and closed as desired. The invention is preferably practiced in a manner that avoids the need for bleeding a portion of refrigerant through the hoses 120, 125. Preferably, the valves 122 are closed to shut off fluid communication between the condenser 110 and the sight glass 10, and the sight glass cavity 20 is evacuated by drawing a vacuum through the fitting 30 connected to a vacuum pump. Evacuation prevents contamination of the refrigerant in the system, which can have a deleterious effect on unit performance. Further, the different partial pressures of air remaining in the sight glass and gaseous refrigerant in the condenser 110 can cause a significant error in the measured level of refrigerant in the sight glass 10. The valve at fitting 30 is then closed.

After evacuation, the lines 120, 125 are opened to allow a portion of refrigerant 8 to enter the sight glass cavity 20. The evacuation of the sight glass 10 allows the refrigerant 8 to fill to an equilibrium level 60 within the sight glass 10 and the condenser 110. The sight glass 10 is then placed adjacent the scale 200, where the meniscus of the refrigerant level 60 is compared to graduated markings 210, which are calibrated to translate into the volume of refrigerant in the system 100. Thus, a static measurement is obtained that indicates the amount of refrigerant in the vapor compression system.

As previously discussed, the scale preferably is located on a surface of the vapor compression system 100 proximate the condenser 110, thus permitting minimal physical transfer of the sight glass 10. Indeed, most preferably, the scale 200 can be disposed on a surface adjacent the very location where the sight glass 10 rests as it fills with refrigerant 8.

The above-described device, system, and method of the present invention provides important improvements in determining the amount of refrigerant present in a vapor compression system. For example, a measure of the volume of refrigerant in the system can be obtained without entirely emptying the system of refrigerant. Rather, as little as one-tenth of one percent of system refrigerant need be extracted from the system and collected in the sight glass. Because such a small proportion can furnish the required system measurement, the interruption to system operation is minimized. Indeed, the present invention allows this measurement to be obtained two to five times faster than is possible with conventional techniques. Consequently, the space serviced by the vapor compression system endures a significantly reduced period without conditioning.

The present system and method can be applied to newly manufactured HVAC systems, or as a retrofit to existing systems. The use of existing taps on the top and bottom of the condenser 110 on an existing system 100 is preferred, if the taps are available. Alternatively, if taps are not already available, taps can be added using, for example, pierce inserted braze taps or drilled and brazed connectors.

Furthermore, the present invention provides a means for evaluating system performance relationships. For example, a given system parameter—such as coefficient of performance—measured at a particular time can be matched to the amount of refrigerant in the system at that time. By gathering additional data at various times, or for varying performance levels, a system performance relationship can be derived. Thus, an empirical evaluation can be drawn for system performance as a function of the amount of refrigerant in the system.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for determining the amount of refrigerant in a vapor compression system, said vapor compressor system including a condenser, a liquid valve after said condenser, a compressor, a discharge service valve on said compressor, and an evaporator, the method comprising:

placing a sight glass in fluid communication with the condenser, the sight glass including a housing defining an interior cavity for holding a volume of refrigerant, and a window on said housing for permitting visual inspection of the level of refrigerant in the cavity; a first axial end, and an opposed second axial end, said first end being in fluid communication with a top portion of the condenser, and said second end being in fluid communication with a bottom portion of the condenser;

transferring the refrigerant in the evaporator to the condenser;

allowing refrigerant to flow from the condenser into the sight glass cavity until an equilibrium level is reached; and comparing the level of refrigerant in the sight glass cavity to a calibrated scale having graduated markings, whereby the amount of refrigerant in the vapor compression system is determined by reading the marking on the scale adjacent the refrigerant level in the sight glass cavity;

wherein the step of transferring the refrigerant in the evaporator to the condenser comprises:
closing the liquid valve after the condenser;
running the compressor until it shuts off on low pressure; and
closing the discharge service valve on the compressor.

2. The method of claim 1 including the step of evacuating the cavity of the sight glass, prior to allowing refrigerant to flow the condenser into the cavity.

3. The method of claim 2 wherein first and second fluid lines provide the fluid communication between said first and second axial ends and said top and bottom portions of the condenser, respectively, the first fluid line including a first valve and the second fluid line including a second valve.

4. The method of claim 3 further comprising the step of closing the first valve and the second valve, after the refrigerant level in the sight glass has reached equilibrium.

5. The method of claim 3 wherein a third fluid line provides fluid communication between the sight glass and a component.

6. The method of claim 5 wherein the component in fluid communication with the sight glass through the third fluid line is a vacuum pump.

7. The method of claim 6 wherein the step of evacuating the sight glass cavity is achieved at least in part through the vacuum pump.

8. The method of claim 5 wherein the component in fluid communication with the sight glass through the third fluid line is a sample bottle.

9. The method of claim 1 wherein the graduated markings signify pounds of refrigerant charge.

10. The method of claim 1 wherein the graduated markings signify the percentage of system charge.

11. The method of claim 1 wherein the calibrated scale is disposed on a wall of the vapor compression system.

12. The method of claim 10 wherein the wall on which the calibrated scale is disposed is adjacent the sight glass as the sight glass fills with refrigerant.

13. The method of claim 1 wherein the calibrated scale is disposed on the condenser.

* * * * *